United States Patent
Yamamoto

(10) Patent No.: US 7,956,524 B2
(45) Date of Patent: Jun. 7, 2011

(54) IMAGE DISPLAY APPARATUS

(75) Inventor: Takeshi Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 234 days.

(21) Appl. No.: 12/396,992

(22) Filed: Mar. 3, 2009

(65) Prior Publication Data

US 2009/0224649 A1  Sep. 10, 2009

(30) Foreign Application Priority Data

Mar. 5, 2008 (JP) ................................. 2008-054747

(51) Int. Cl.
*H01J 5/02* (2006.01)
(52) U.S. Cl. ........ 313/292; 313/493; 313/634; 313/482; 313/252
(58) Field of Classification Search .................. None
See application file for complete search history.

(56) References Cited

U.S. PATENT DOCUMENTS

| | | | |
|---|---|---|---|
| 5,046,826 A | 9/1991 | Iwamoto et al. | 359/49 |
| 6,216,989 B1 | 4/2001 | Shioya et al. | 248/122.1 |
| 6,744,186 B2 | 6/2004 | Oishi et al. | 313/46 |
| 7,095,169 B2 * | 8/2006 | Ohishi et al. | 313/495 |
| 7,258,588 B2 * | 8/2007 | Yakou et al. | 445/24 |
| 7,542,286 B2 * | 6/2009 | Kang | 361/690 |
| 7,663,306 B2 * | 2/2010 | Imamura | 313/506 |
| 2006/0163988 A1 * | 7/2006 | Kang et al. | 313/110 |
| 2008/0180019 A1 * | 7/2008 | Hirasawa et al. | 313/496 |

FOREIGN PATENT DOCUMENTS

| | | |
|---|---|---|
| JP | 2001-345586 | 12/2001 |
| JP | 2004-152676 | 5/2004 |
| JP | 2006-133355 | 5/2006 |

* cited by examiner

*Primary Examiner* — Ashok Patel
(74) *Attorney, Agent, or Firm* — Fitzpatrick, Cella, Harper & Scinto

(57) ABSTRACT

An image display apparatus includes a display panel having a face plate, a rear plate, and a frame member, forming a vacuum container, a plurality of plate-like spacers arranged between the face plate and the rear plate in an interior of the vacuum container to maintain an internal space of the vacuum container, and a support member that supports a rear surface of the display panel. The support member includes a plate-like member having a plurality of protruding portions with a linear shape, and a longitudinal direction of the protruding portions and a longitudinal direction of the spacers are substantially parallel to each other.

8 Claims, 7 Drawing Sheets

VERTICAL
DIRECTION
↕
↔ HORIZONTAL
DIRECTION

VERTICAL DIRECTION

HORIZONTAL DIRECTION

VERTICAL DIRECTION

HORIZONTAL DIRECTION

IMAGE DISPLAY APPARATUS

BACKGROUND OF THE INVENTION

1. Field of the Invention

This invention relates to an image display apparatus.

2. Description of the Related Art

As a conventional technique for preventing the breakage of a display panel (breakage of a vacuum container or a spacer) of the image display apparatus, a configuration has been proposed in which a support unit is inserted between the display panel and the exterior member. The breakage of the display panel is caused by a shock from an external source, the vibration during the transportation or installation, static handling or the drop impact due to the careless handling.

Japanese Patent Application Laid-Open Nos. 2001-345586 and 2006-133355 disclose a support structure of a display apparatus including a first chassis member and a second chassis member and a hollow portion between the two chassis members.

Also, in an image display apparatus having an electron-emitting device, the interior of the display panel (image display apparatus) is maintained at a lower pressure than the atmospheric pressure. For this reason, a spacer for maintaining the internal space of the display panel is appropriately arranged in the display panel.

Japanese Patent Application Laid-Open No. 2004-152676 discloses a plate-like spacer having the longitudinal direction along the surface of the display panel as a spacer of the image display apparatus.

In the case where the spacer as disclosed in Japanese Patent Application Laid-Open No. 2004-152676 is arranged, a high-strength rear surface support member is required to suppress the deformation along the longitudinal direction of the spacer. Specifically, the strength of the rear surface support member is increased by increasing the thickness of the rear surface support member to secure sufficient strength. The resulting problem is a large weight and a high material cost.

SUMMARY OF THE INVENTION

This invention has been achieved to solve this problem, and the object thereof is to provide an inexpensive, lightweight image display apparatus having sufficient support strength.

In order to achieve the object described above, a first aspect of an image display apparatus according to the present invention is an image display apparatus comprising:

a display panel including a face plate, a rear plate and a plate-like spacer arranged between the face plate and the rear plate; and a support member that supports a rear surface of the display panel, wherein the support member includes a plate-like member having a protruded portion, and wherein a longitudinal direction of the protruded portion and a longitudinal direction of the spacer are substantially parallel to each other.

A second aspect of an image display apparatus according to the present invention is an image display apparatus comprising:

a display panel including a face plate, a rear plate and a plate-like spacer arranged between the face plate and the rear plate; and a support member that supports a rear surface of the display panel, wherein the display panel and the support member are bonded to each other through a bonding member, and wherein a longitudinal direction of the bonding member and a longitudinal direction of the spacer are substantially parallel to each other.

This invention provides an image display apparatus low in cost, small in weight and having sufficient support strength.

Further features of the present invention will become apparent from the following description of exemplary embodiments with reference to the attached drawings.

DESCRIPTION OF THE EMBODIMENTS

An embodiment of the invention is explained below.

The method of supporting an image display apparatus according to this embodiment is effectively used for a thin display apparatus (thin display panel) requiring the reinforcement of the support unit (rear surface support member), or especially, effectively used for a display panel required to suppress the deformation or the stress generated in a specified direction. This method is effectively used with, for example, the display panel of the image display apparatus in which the interior of the display panel is maintained at a pressure lower than the atmospheric pressure and which has a plate-like spacer having the longitudinal direction along the surface of the display panel. Specifically, this method is effective to relax the stress concentration or deformation along the longitudinal direction of the spacer of such a display panel as a supporting method. Incidentally, the display panel according to this embodiment is adapted for use with the image display apparatus having an electron-emitting device (cold-cathode device), the plasma display, the liquid crystal display and the EL display. The display panel may be a flat thin display panel. The electron-emitting device is, for example, a surface conduction-type electron-emitting device, a field emission-type electron-emitting device or an MIM electron-emitting device.

Figure 1:
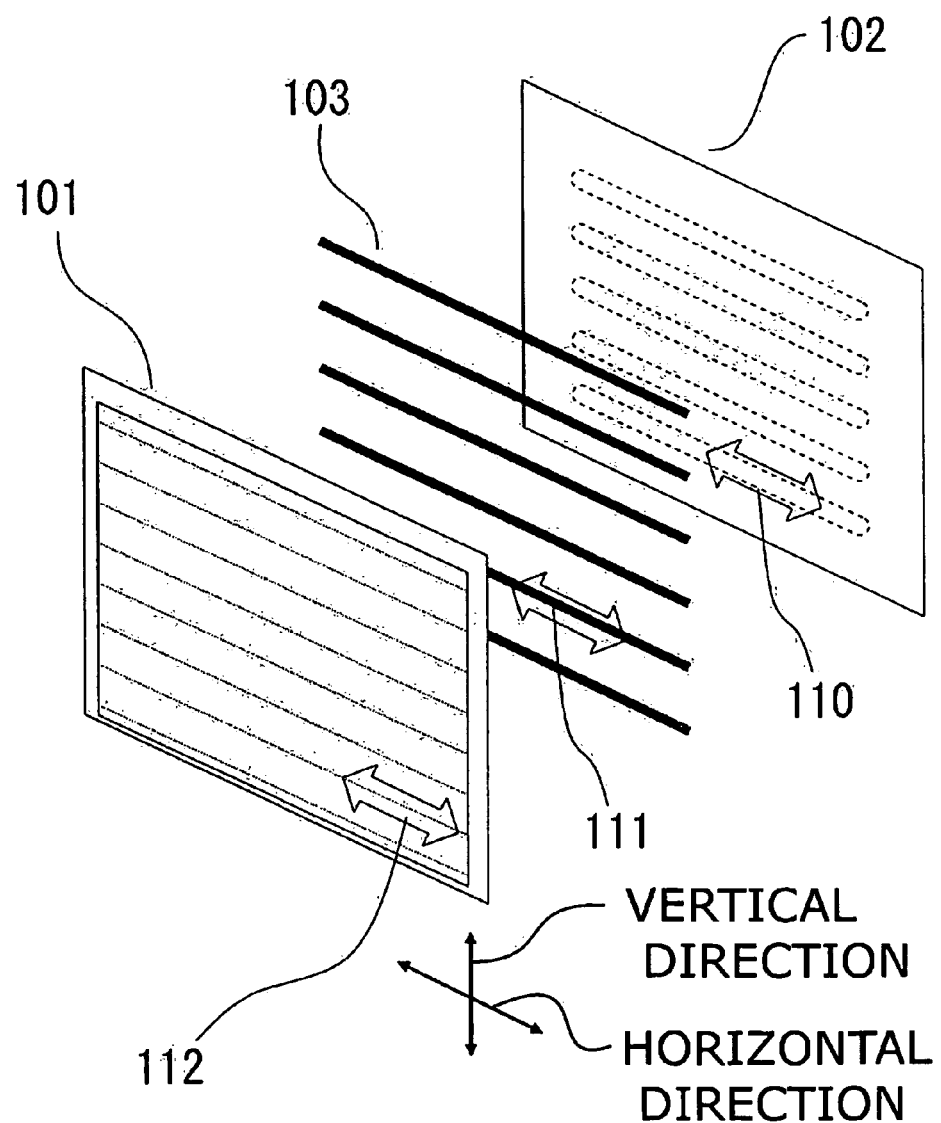
FIG. 1 is an exploded view showing an example of an image display apparatus.

The image display apparatus according to this embodiment is explained with reference to FIG. 1. FIG. 1 is an exploded view of an example of the image display apparatus. In FIG. 1, various electric circuit boards are not shown.

In FIG. 1, reference numeral 101 designates a display panel. According to this embodiment, the interior of the display panel 101 is maintained at a pressure lower than the atmospheric pressure, and the display panel includes a plate-like spacer having the longitudinal direction along the surface of the display panel. Numeral 112 designates an arrow indicating the longitudinal direction (hereinafter referred to as the spacer length direction) of the spacer (not shown) in the display panel 101. In the case of FIG. 1, for example, the spacer length direction is the horizontal direction (the direction along the width or transverse direction) of the display panel.

Numeral 102 designates a rear surface support member that supports a rear surface of the display panel. According to this embodiment, the rear surface support member 102 has a plate-like member with protruded portions. Each protruded portion may be in any shape protruded from the base surface (reference surface) of the plate-like member. Numeral 110 designates an arrow indicating the longitudinal direction of the protruded portion (hereinafter referred to as the protruded portion length direction) of the plate-like member making up the rear surface support member 102. Specifically, in the case of FIG. 1, the plate-like member has horizontally long rib-like protruded portions (protruded portions having the longitudinal direction along the surface of the display panel). According to this embodiment, the protruded portion length direction 110 and the direction 112 along the spacer length (hereinafter referred to as the spacer length direction 112) are substantially parallel to each other thereby to reduce the deformation and stress concentration along the spacer length direction. Incidentally, the rear surface support member 102 may be either a single plate-like member or a combination of plural plate-like members. An example of the configuration of the rear surface support member 102 is described later.

Also, the display panel 101 and the rear surface support member 102 may be bonded to each other. In the case of FIG. 1, for example, the display panel 101 is bonded (fixed) to the rear surface support member 102 by a bonding member 103. The bonding member 103 includes an adhesive and a two-side tape. The material, shape, thickness or area of the bonding member is appropriately set taking the strength, shock absorption and heat conductivity of the bonding member and the flatness of the support member into consideration. In the case where the bonding member 103 is arranged in a part of surface of the display panel, the longitudinal direction of the bonding member 103 (the longitudinal direction along the surface of the display panel; hereinafter sometimes referred to as the bonding member length direction 111) is desirably substantially parallel to the spacer length direction 112 (protruded portion length direction 110). By doing so, the deformation of a spacer and concentration of stress on the spacer can be reduced. Incidentally, the width of the bonding member 103 can be set arbitrarily.

Next, an example of the configuration of the rear surface support member 102 is explained with reference to FIGS. 2A to 6B.

FIRST CONFIGURATION EXAMPLE

Figure 2A:
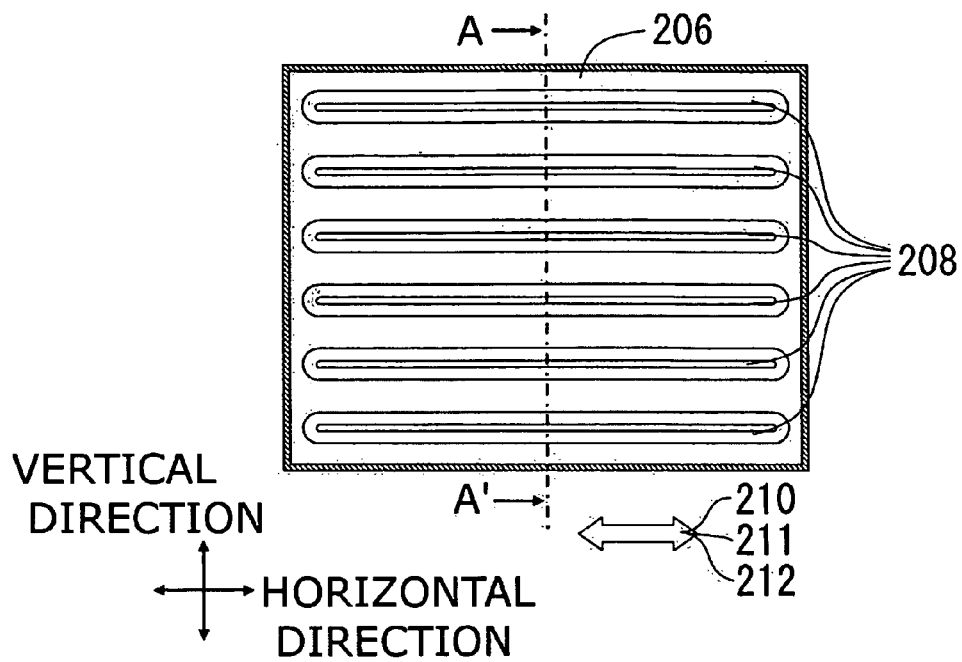
FIGS. 2A and 2B are diagrams showing a first example of the configuration of the rear surface support member.
Figure 2B:
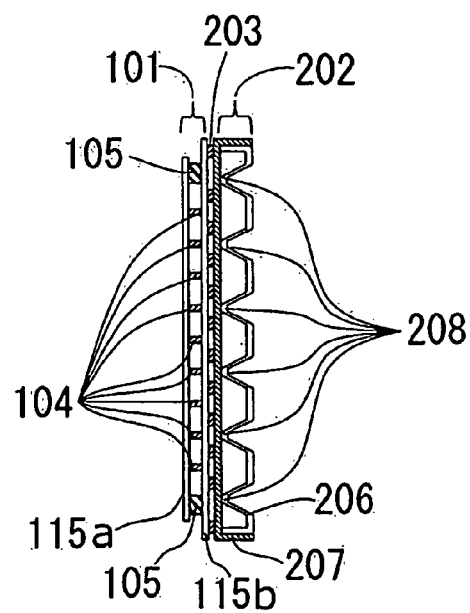

FIGS. 2A and 2B are diagrams showing a first configuration example of the rear surface support member 102, in which FIG. 2A is a view taken from the rear side of the image display apparatus and FIG. 2B a sectional view taken along dashed-line A-A' in FIG. 2A.

Numeral 101 designates a display panel, numeral 115a a face plate, numeral 115b a rear plate, numeral 105 a frame member and numeral 104 a plate-like spacer arranged between the face plate and the rear plate. The face plate 115a, the rear plate 115b and the frame member 105 form a vacuum container. The interior of the vacuum container is maintained at a pressure lower than the atmospheric pressure, and therefore, the internal space of the vacuum container is maintained by the spacer 104. In the case of FIGS. 2A and 2B, for example, the spacer length direction 212 is horizontal direction.

Numeral 202 designates a rear surface support member that supports a rear surface of the display panel, and numeral 203 a bonding member. The rear surface support member 202 is configured of two plate-like members. In FIG. 2B, numeral 206 designates a first plate-like member and numeral 207 a second plate-like member. In this configuration example, one of the two plate-like members has plural protruded portions fixed on the other plate-like member. In the case of FIG. 2B, for example, the first plate-like member 206 has plural protruded portions 208. The protruded portions 208 are protruded from the reference surface of the first plate-like member 206 toward the second plate-like member 207 (onto the second plate-like member side). The first plate-like member 206 and the second plate-like member 207 are fixed by the protruded portions 208 and the edge portion of the first plate-like member 206. The fixing means may be any of riveting, caulking, pressure-fitting, welding and bonding.

The first plate-like member 206 and the second plate-like member 207 may be formed of such a material as resin, or desirably, a metal such as aluminum, iron or magnesium. The first plate-like member 206 and the second plate-like member 207 formed of a metal have the following advantages:

Usable as a GND member
Usable as a part for EMC
Superior thermal uniformity
High fire retardance
High strength Also, a superior flatness can be obtained at low cost by forming the first plate-like member 206 and the second plate-like member 207 in press working. The first plate-like member 206 and the second plate-like member 207, if are pressed in combination, on the other hand, can be caulked or pressure-fitted at plural points at the same time. As a result, the number of the required fabrication steps is reduced, thereby reducing the production cost of the rear surface support member 202.

Numeral 210 designates the longitudinal direction of the protruded portions 208, and numeral 211 the longitudinal direction of the bonding member 203. In the case of FIGS. 2A and 2B, for example, the protruded portion length direction 210 and the bonding member length direction 211 are in a substantially horizontal direction of the display panel.

According to this configuration example with the protruded portion length direction 210 and the spacer length direction 212 substantially parallel to each other, the deformation of and concentration of stress on the spacer can be reduced. Further, the bonding member length direction 211 is set substantially parallel to the spacer length direction 212 (protruded portion length direction 210), so that the resulting uniform presence of the bonding member over the section of the spacer length direction can further reduce the stress concentration.

Figure 3A:
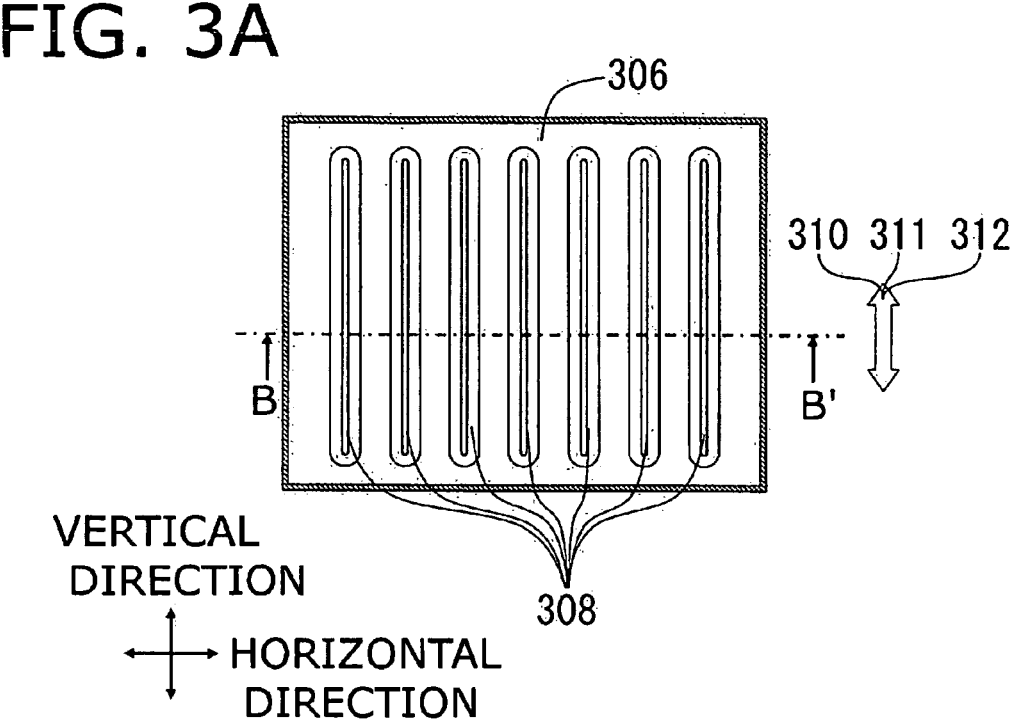
FIGS. 3A and 3B are diagrams showing the first example of the configuration in the case where the longitudinal direction of the spacer is the vertical direction.
Figure 3B:
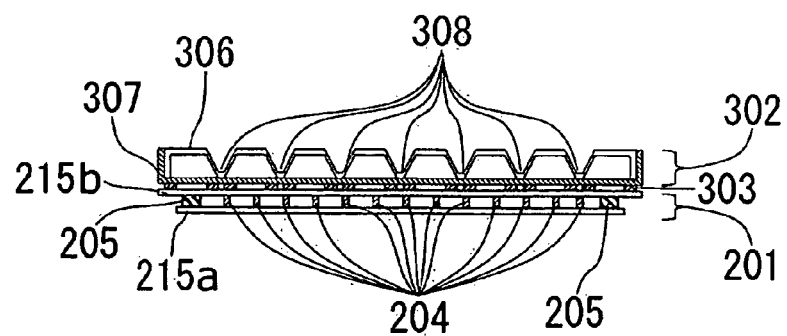

FIGS. 3A and 3B are diagrams showing a first configuration example in which the spacer length direction 312 is vertical direction, in which FIG. 3A is a view taken from the rear side of the image display apparatus, and FIG. 3B a sectional view taken along dotted chain B-B' in FIG. 3A.

Numeral 201 designates a display panel, numeral 215a a face plate, numeral 215b a rear plate, numeral 205 a frame member, and numeral 204 a spacer. The face plate 215a, the rear plate 215b and the frame member 205 make up a vacuum container. The interior of the vacuum container is maintained at a pressure lower than the atmospheric pressure, and therefore, the internal space of the vacuum container is maintained by the spacer 204. In the case of FIGS. 3A and 3B, the spacer length direction 312 is a vertical direction.

Numeral 302 designates a rear surface support member, and numeral 303 a bonding member. The rear surface support member 302 is configured of a first plate-like member 306 and a second plate-like member 307. The first plate-like member 306 has plural protruded portions 308. The first plate-like member 306 and the second plate-like member 307 are fixed to each other by the protruded portions 308 and the edge portion of the first plate-like member 306. In the case of FIGS. 3A and 3B, for example, the protruded portion length direction 310 and the bonding member length direction 311 are vertical direction.

As shown in FIGS. 3A and 3B, in the case where the spacer length direction 312 is a vertical direction, the protruded portion length direction 310 and the bonding member length direction 311 are also a vertical direction. By setting the protruded portion length direction 310 and the bonding member length direction 311 substantially parallel to the spacer length direction 312, the stress concentration on the spacer can be alleviated.

SECOND CONFIGURATION EXAMPLE

Figure 4A:
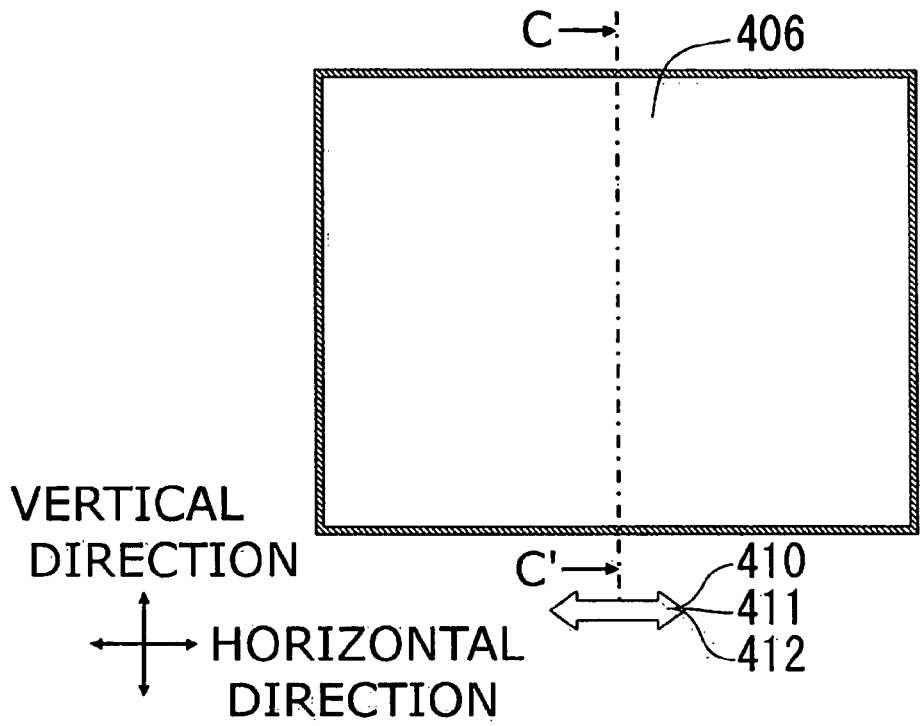
FIGS. 4A and 4B are diagrams showing a second example of the configuration of the rear surface support member.
Figure 4B:
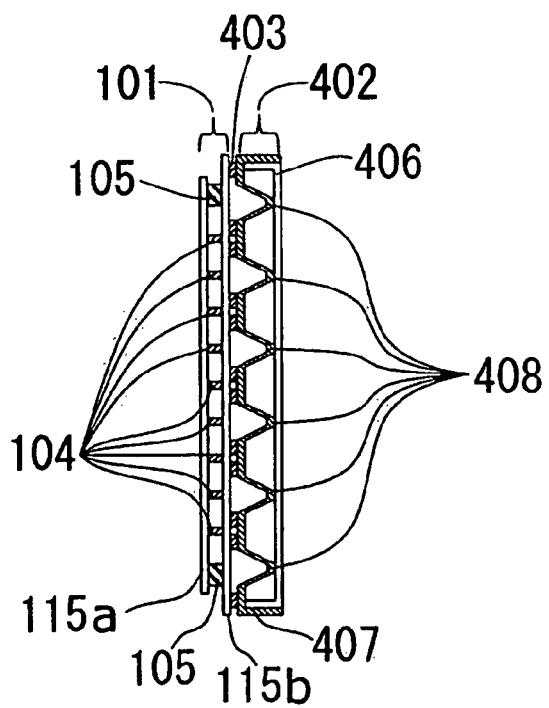

FIGS. 4A and 4B are diagrams showing a second configuration example of the rear surface support member. FIG. 4A is a view taken from the rear side of the image display apparatus, and FIG. 4B a sectional view taken along dashed-line C-C' in FIG. 4A.

Numeral 101 designates a display panel, numeral 104 a spacer, numeral 105 a frame member, numeral 115a a face plate and numeral 115b a rear plate. The spacer length direction 412 is a horizontal direction. Numeral 402 designates a rear surface support member and numeral 403 a bonding member. The rear surface support member 402 is configured of two plate-like members. In FIG. 4B, numeral 406 designates a first plate-like member, and numeral 407 a second plate-like member. In this configuration example, one of the plate-like members has plural protruded portions which are fixed on the other plate-like member. In the case of FIG. 4B, for example, the second plate-like member 407 has the plural protruded portions 408. The protruded portions 408 are protruded toward the first plate-like member 406 (on the first plate-like member 406 side) from the base surface of the second plate-like member 407. The first plate-like member 406 and the second plate-like member 407 are fixed to each other by the protruded portions 408 and the edge portion of the second plate-like member 407. In the case of FIGS. 4A and 4B, for example, the protruded portion length direction 410 and the bonding member length direction 411 are the horizontal direction.

In this configuration example, unlike in the configuration of FIGS. 2A and 2B, the second plate-like member 407 has protruded portions 408 formed toward the first plate-like member 406 from the references surface of the second plate-like member 407. Also in this case, the spacer length direction, the protruded portion length direction and the bonding member length direction are set substantially parallel to each other, so that as in the first configuration, the deformation of and the stress concentration on the spacer can be reduced. Incidentally, in the case where the spacer length direction 412 is vertical direction as shown in FIGS. 3A and 3B, a similar effect can be achieved by setting the protruded portion length direction 410, the bonding member length direction 411 or both in a vertical direction.

THIRD CONFIGURATION EXAMPLE

Figure 5A:
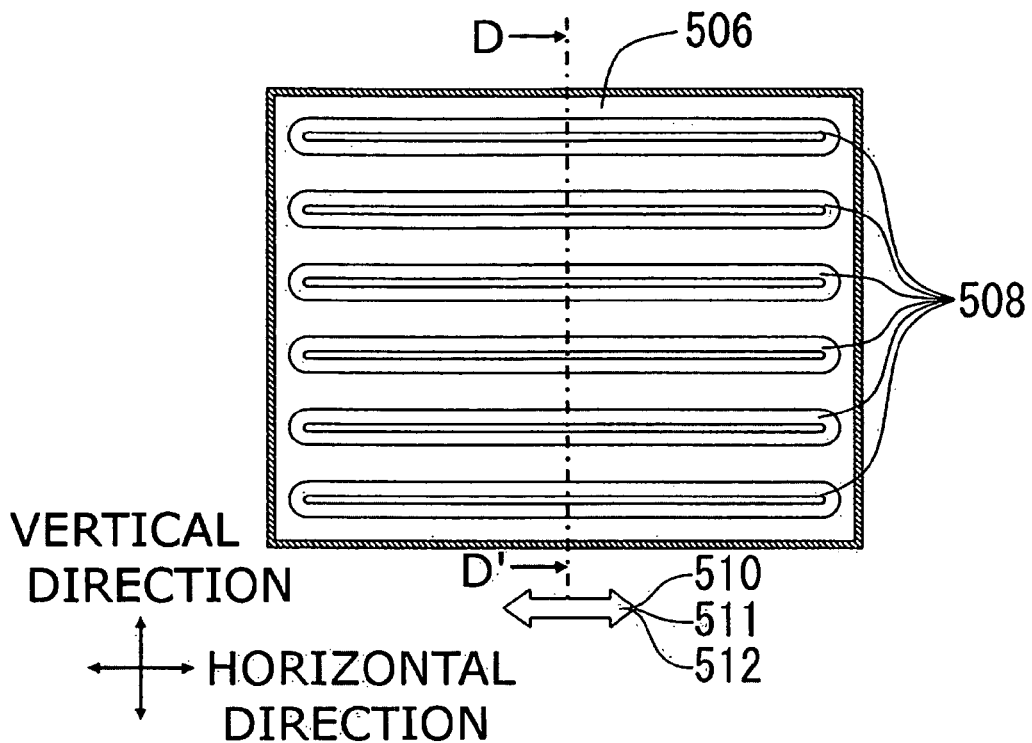
FIGS. 5A and 5B are diagrams showing a third example of the configuration of the rear surface support member.
Figure 5B:
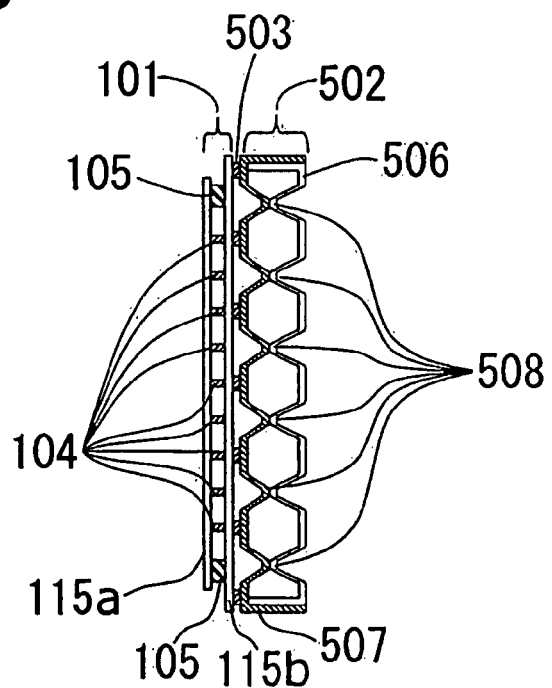

FIGS. 5A and 5B are diagrams showing a third configuration example of the rear surface support member. FIG. 5A is a view taken from the rear side of the image display apparatus, and FIG. 5B a sectional view taken along dashed-line D-D' in FIG. 5A.

Numeral 101 designates a display panel, numeral 104 a spacer, numeral 105 a frame member, numeral 115a a face plate and numeral 115b a rear plate. The spacer length direction 512 is a horizontal direction. Numeral 502 designates a rear surface support member, and numeral 503 a bonding member. The rear surface support member 502 is configured of a first plate-like member 506 and a second plate-like member 507. According to this configuration example, both the first plate-like member 506 and the second plate-like member 507 have plural protruded portions 508. The protruded portions 508 in this configuration example is configured of the portions protruded from the references surface of the first plate-like member 506 toward the second plate-like member 507 (first protruded portions) and the portions protruded toward the first plate-like member 506 from the references surface of the second plate-like member 507 (second protruded portions). The first plate-like member 506 and the second plate-like member 507 are fixed to each other by the protruded portions 508 and the peripheral portions of both members. In the case of FIGS. 5A and 5B, for example, the protruded portion length direction 510 and the bonding member length direction 511 are the horizontal direction.

In this configuration example, as described above, both the first plate-like member 506 and the second plate-like member 507 have plural protruded portions. The protruded portions 508 of each plate-like member are formed from the reference surface of the one plate-like member directed toward the other plate-like member. Specifically, the protruded portions 508 of the first plate-like member 506 are formed toward the second plate-like member 507 from the references surface of the first plate-like member 506, while the protruded portions 508 of the second plate-like member 507 are formed in the direction from the references surface of the second plate-like member 507 toward the first plate-like member 506. Further, the protruded portions 508 of the first plate-like member 506 are located at positions corresponding to the protruded portions 508 of the second plate-like member 507. Also in this case, the spacer length direction, the protruded portion length direction and the bonding member length direction are substantially parallel to each other, so that as in the aforementioned configuration example, the deformation of and the stress concentration on the spacer can be reduced. Incidentally, in the case where the spacer length direction 512 is a vertical direction as shown in FIGS. 3A and 3B, a similar effect can be obtained by setting the protruded portion length direction 510 and/or the bonding member length direction 511 in a vertical direction.

FOURTH CONFIGURATION EXAMPLE

Figure 6A:
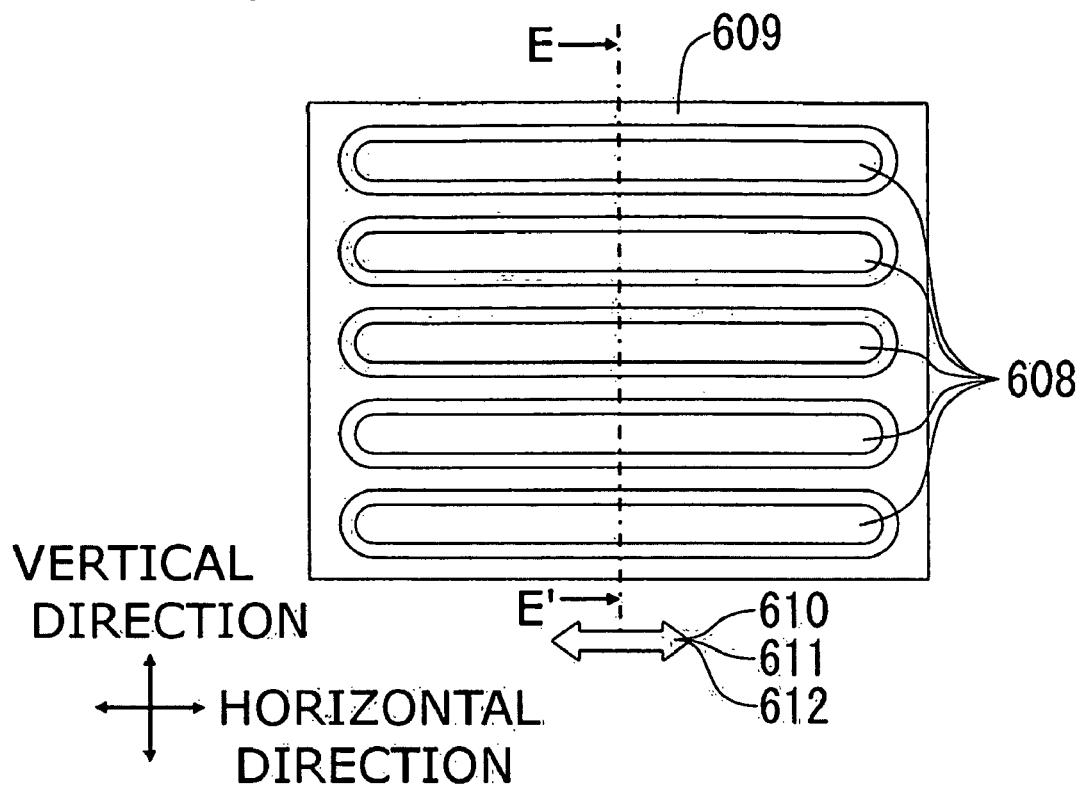
FIGS. 6A and 6B are diagrams showing a fourth example of the configuration of the rear surface support member.
Figure 6B:
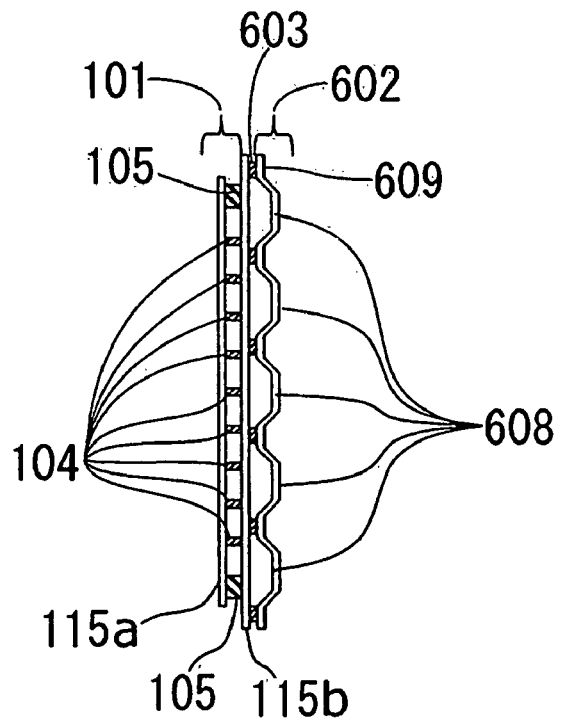

FIGS. 6A and 6B are diagrams showing a fourth configuration example of the rear surface support member. FIG. 6A is a view taken from the rear side of the image display apparatus, and FIG. 6B a sectional view taken along dashed-line E-E' in FIG. 6A.

Numeral 101 designates a display panel, numeral 104 a spacer, numeral 105 a frame member, numeral 115a a face plate and numeral 115b a rear plate. The spacer length direction 612 is horizontal direction. Numeral 602 designates a rear surface support member, and numeral 603 a bonding member. The rear surface support member 602 is configured of a plate-like member 609. According to this configuration example, the plate-like member 609 has plural protruded portions 608. The protruded portions 608 in this configuration example are formed from the references surface of the plate-like member 609 toward the rear side (away from the rear plate 115b). The protruded portion length direction 610 and the bonding member length direction 611 are in the horizontal direction.

In the configuration example, as described above, the rear surface support member is formed of a single plate-like member, and the protruded portions of the plate-like member are formed toward the side (toward the rear surface side) far from the display panel.

Also in this case, the spacer length direction, the protruded portion length direction and the bonding member length direction set substantially parallel to each other can reduce the deformation of or the stress concentration on the spacer as in the configuration example described above. Incidentally, in the case where the spacer length direction 612 is a vertical direction as shown in FIGS. 3A and 3B, a similar effect can be obtained by setting the protruded portion length direction 610 or the bonding member length direction 611 or both of them in a vertical direction.

The protruded portions may alternatively be formed from the references surface of the plate-like member 609 toward the display panel.

FIFTH CONFIGURATION EXAMPLE

Figure 7A:
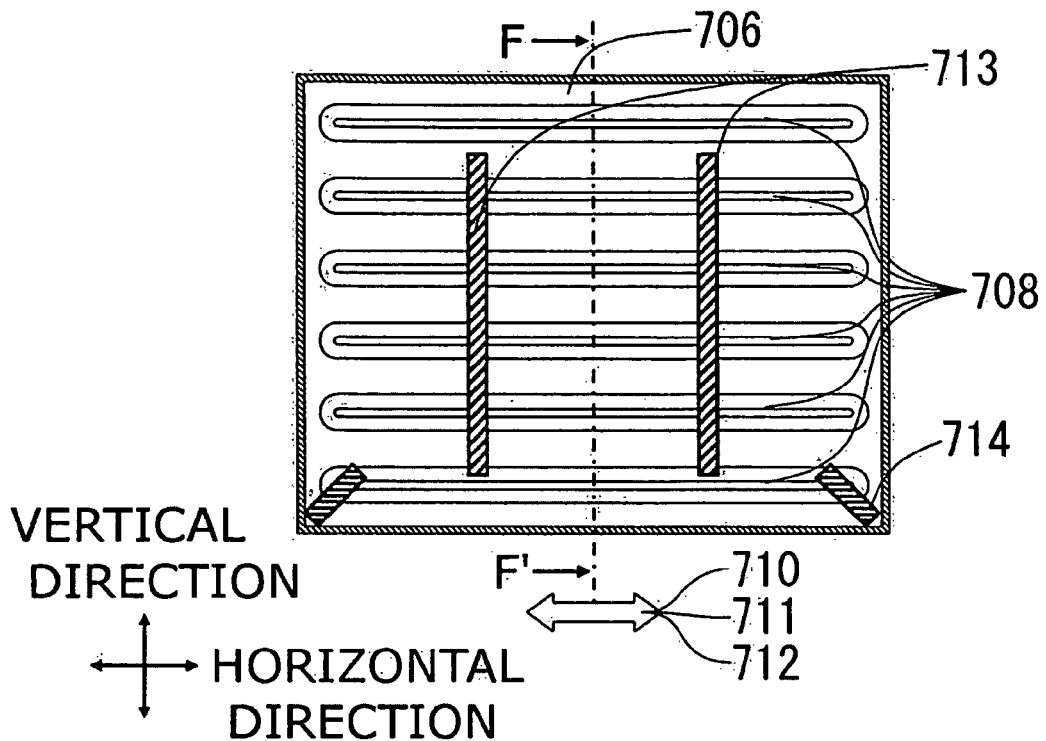
FIGS. 7A and 7B are diagrams for explaining a variation example of the configuration of the rear surface support member.
Figure 7B:
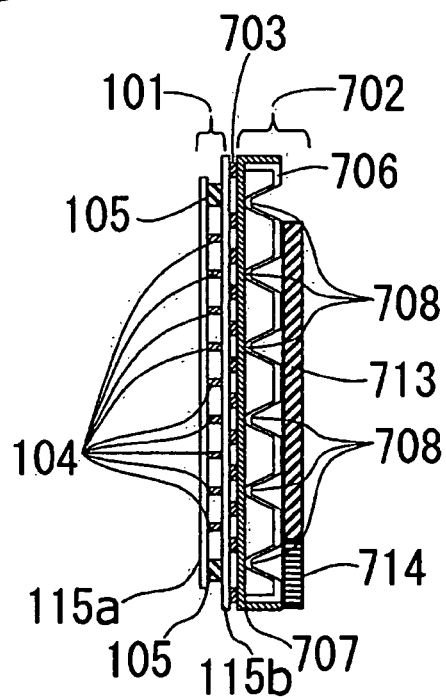

FIGS. 7A and 7B are diagrams for explaining a variation of the configuration example of the rear surface support member. FIG. 7A is a view taken from the rear side of the image display apparatus, and FIG. 7B a sectional view taken along dashed-line F-F' in FIG. 7A.

Numeral 101 designates a display panel, numeral 104 a spacer, numeral 105 a frame member, numeral 115a a face plate and numeral 115b a rear plate. The spacer length direction 712 is a horizontal direction. Numeral 702 designates a rear surface support member, and numeral 703 a bonding member. The rear surface support member 702 is configured of a first plate-like member 706 and a second plate-like member 707. The first plate-like member 706 has plural protruded portions 708. The protruded portions 708 in this configuration example, like those in the first configuration example, constitute the portions protruded from the references surface of the first plate-like member 706 toward the second plate-like member 707. The first plate-like member 706 and the second plate-like member 707 are fixed to each other by the protruded portions 708 and the edge portion of the first plate-like member 706. In the case of FIGS. 7A and 7B, for example, the protruded portion length direction 710 and the bonding member length direction 711 are the horizontal direction.

This configuration example further includes reinforcing members that reinforces the rear surface of the rear surface support member. Specifically, an additional reinforcing member A and an additional reinforcing member B are arranged at a predetermined position on the rear side (the side far from the display panel) of the first plate-like member 706. In FIGS. 7A and 7B, numeral 713 designates the additional reinforcing member A, and numeral 714 the additional reinforcing member B. The additional reinforcing member A is arranged, for example, at the position where the housing (exterior member) is mounted. In the case of FIGS. 7A and 7B, two additional reinforcing members A are provided and arranged at left and right positions (horizontally), respectively, at substantially the same distance from the center of the display panel. The additional reinforcing member A is a plate-like member having the vertically longitudinal direction along the surface of the display panel. The additional reinforcing member B, for example, is arranged at a position where the stand is mounted.

In the case of FIGS. 7A and 7B, for example, two additional reinforcing members B are arranged at the lower end corners of the display panel. The additional reinforcing member B is a plate-like member having the longitudinal direction along the surface of the display panel, which longitudinal direction is substantially the same direction as the diagonal line of the display panel.

Incidentally, the additional reinforcing members A and B are not limited to those included in the first configuration example described above, and may alternatively be arranged on the image display apparatus of the second to fourth configuration examples described above. In view of the fact that a local force is exerted especially on the portions mounted externally on the stand or the like or the external portions where the housing is mounted, the partial deformation can be effectively suppressed by the reinforcement using bar or plate-like members such as the additional reinforcing members A713 and B714.

Also in the presence of the additional reinforcing members A and B, the spacer length direction, the protruded portion length direction and the bonding member length direction may be arranged substantially in parallel to each other. As a result, as in the configuration examples described above, the deformation of and the stress concentration on the spacer can be reduced. Also, the additional reinforcing members A and B are not limited to the configuration (position and shape) described above, and may not be in the form of plates and alternatively be in the form of a bar. In other words, any position or shape can be employed as long as the partial external stress can be alleviated.

Specific embodiments are described below.

The matter shared by the image display apparatus according to the embodiments described below is explained with reference to FIG. 1. In FIG. 1, numeral 101 designates a display panel, and numeral 102 a rear surface support member. The display panel 101 and the rear surface support member 102 are fixed to each other through a bonding member 103. An electric circuit board (not shown) is fixed on the rear surface support member 102.

The embodiments described below use the display panel of an image display apparatus having an electron-emitting device as the display panel 101. The interior of the display panel 101 according to this embodiment is maintained in vacuum, and the atmospheric pressure is supported by the spacer having the longitudinal direction designated by arrow 112, which indicates the longitudinal direction of the spacer arranged on the display panel 101. Specifically, the display panel 101 has a horizontally long spacer.

The rear surface support member 102 includes a plate-like member having plural protruded portions. The arrow 110 indicates the longitudinal direction of the protruded portions. Specifically, the plate-like member has horizontally long rib-like protruded portions. In the embodiments described below, the deformation of and the stress concentration on the spacer are reduced by arranging the protruded portion length direction 110 and the spacer length direction 112 set substantially in parallel to each other.

An adhesive or a two-side tape may be used as the bonding member 103. The embodiments described below use an elastic resin adhesive of silicon and a two-side tape having the base material of silicon. The silicon adhesive is coated linearly over the width of about 5 to 15 mm in the thickness of 0.5 to 2 mm. The longitudinal direction of the coating is substantially parallel to the spacer length direction 112 and the protruded portion length direction 110 so that the adhesive member is uniformly present in the section along the spacer length direction, thereby further reducing the stress concentration.

First Embodiment

The first configuration of the rear surface support member is explained with reference to FIGS. 2A and 2B. FIG. 2A is a view taken from the rear side of the image display apparatus. A plurality of protruded portions 208 having a longitudinal direction are formed in the first plate-like member 206. The longitudinal direction is substantially a horizontal direction.

FIG. 2B is a sectional view taken along dashed-line A-A' in FIG. 2A. The rear surface support member 202 is configured of a first plate-like member 206 and a second plate-like member 207. According to this embodiment, the first plate-like member 206 and the second plate-like member 207 are formed in press molding, and the first plate-like member 206 has plural protruded portions 208 directed toward the second plate-like member 207. The protruded portions 208 of the first plate-like member 206 have a horizontal longitudinal direction, and the protruded portion length direction 210 is substantially parallel to the spacer length direction 212. The first plate-like member 206 and the second plate-like member 207 are integrated with each other by being fixed through the protruded portions 208. According to this embodiment, the inside portion of the plate-like members is fixed by TOX caulking and the edge portion thereof by riveting or screw. Nevertheless, the particular inside portion may alternatively be fixed by welding, burring caulking, etc.

Further, the portion requiring sufficient strength to be fixed on an external part is reinforced by the additional reinforcing member A as shown in FIGS. 7A and 7B. Also, the portion requiring sufficient strength to fix the housing is locally reinforced by the additional reinforcing member B.

In order to confirm the effect of support by the rear surface support member, the drop impact test and the vibration test were conducted, thereby confirming that the image can be displayed in stable fashion. The configuration of the image display apparatus according to this embodiment can secure the shock resistance three times higher than in the prior art. Further, the weight can be reduced to 80% of that of the conventional apparatus, thereby making it possible to reduce the parts cost correspondingly.

Second Embodiment

A second configuration of the rear surface support member is explained with reference to FIGS. 4A and 4B. The protruded portions 408 making up the rear surface support member 402, conversely to the case shown in FIGS. 2A and 2B, are protruded from the second plate-like member 407 toward the first plate-like member 406.

With this configuration, the packaging surface of the electric circuit board on the rear surface support member can be flattened. As a result, the packaging design limitation of the electric circuit board can be relaxed.

Third Embodiment

A third configuration of the rear surface support member is explained with reference to FIGS. 5A and 5B. According to this embodiment, the first plate-like member 506 and the second plate-like member 507 making up the rear surface support member 502 each have plural protruded portions 508. The protruded portions 508 are formed from the references surface of one plate-like member toward the other. Specifically, the protruded portions 508 of the first plate-like member 506 are formed toward the second plate-like member 507 from the references surface of the first plate-like member 506, while the protruded portions 508 of the second plate-like member 507 are formed toward the first plate-like member 506 from the references surface of the second plate-like member 507. Further, the protruded portions 508 of the first plate-like member 506 are arranged at positions corresponding to the protruded portions 508 of the second plate-like member 507.

With this configuration, assume that the thickness of the rear surface support member 502 as a whole is equalized to that of the rear surface support member according to other embodiments. The reduction of each of the first plate-like member 506 and the second plate-like member 507 can be smaller than in the case where the protruded portions are formed on only one of the plate-like members, and therefore, the production is facilitated. Also, it can be that reducing the width of the protruded portions 508 and the interval between the adjoining protruded portions by the smaller reduction.

Fourth Embodiment

A fourth configuration of the rear surface support member is explained with reference to FIGS. 6A and 6B. According to this embodiment, the rear surface support member 602 is formed of one plate-like member 609 instead of two plate-like members. Although the strength is lower than in the first embodiment, the greater advantage of weight and cost reduction can be achieved than in the other embodiments.

As described above, according to this embodiment, a high support strength can be obtained by the simple method of arranging the longitudinal direction of the protruded portions and the bonding member substantially in parallel to the longitudinal direction of the spacer. Especially, the deformation of and the stress concentration on the spacer can be reduced. Specifically, the strength is improved against the vibration and the drop impact. Also, this configuration reduces the weight and material cost.

Although this embodiment represents a case in which the protruded portions of the rear surface support member are in rib form, the protruded portions may assume any other size or shape. For example, a flat or a curved surface or a combination thereof may be employed.

Also, unlike in this embodiment with the rear surface support member having plural protruded portions, the rear support member may have no protruded portion. As long as the longitudinal direction of the spacer is substantially parallel to that of the bonding member, the deformation of and the stress concentration on the spacer can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-054747 filed on Mar. 5, 2008, which is hereby incorporated by reference herein in their entirety.

What is claimed is:

1. An image display apparatus, comprising:
   a display panel including a face plate, a rear plate, and a frame member, forming a vacuum container;
   a plurality of plate-like spacers arranged between the face plate and the rear plate in an interior of the vacuum container to maintain an internal space of the vacuum container; and a support member that supports a rear surface of the display panel, wherein the support member includes a plate-like member having a plurality of protruding portions with a linear shape, and wherein a longitudinal direction of the protruding portions and a longitudinal direction of the spacers are substantially parallel to each other.

2. An image display apparatus according to claim 1, wherein the display panel and the support member are bonded to each other through a plurality of bonding members with a linear shape, and wherein a longitudinal direction of the bonding members and the longitudinal direction of the spacers are substantially parallel to each other.

3. An image display apparatus according to claim 1, further comprising:

a reinforcing member that reinforces the rear surface of the support member.

4. An image display apparatus according to claim 1, wherein the support member is configured of two plate-like members, and wherein the protruding portions are formed on one of the plate-like members and fixed on the other plate-like member.

5. An image display apparatus according to claim 1, wherein the support member is configured of first and second plate-like members, wherein the protruding portions includes first protruding portions formed on the first plate-like member and second protruding portions formed on the second plate-like member, and wherein the first and second protruding portions are fixed to each other.

6. An image display apparatus according to claim 1, wherein the display panel includes an electron-emitting device.

7. An image display apparatus, comprising:

a display panel including a face plate, a rear plate, and a frame member, forming a vacuum container;

a plurality of plate-like spacers arranged between the face plate and the rear plate in an interior of the vacuum container to maintain an internal space of the vacuum container; and a support member that supports a rear surface of the display panel, wherein the display panel and the support member are bonded to each other through a plurality of bonding members with a linear shape, and wherein a longitudinal direction of the bonding members and a longitudinal direction of the spacers are substantially parallel to each other.

8. An image display apparatus according to claim 7, wherein the display panel includes an electron-emitting device.

\* \* \* \* \*